G. D. Gillett,

Harness Trimming.

N° 79,822. Patented July 14, 1868.

Witnesses:
Beverly Chase
Victor E. Hopstein

Inventor:
Geo. D. Gillett
per F. A. Morley
Atty.

United States Patent Office.

GEORGE D. GILLETT, OF MERIDIAN, NEW YORK.

Letters Patent No. 79,822, dated July 14, 1868.

IMPROVEMENT IN ATTACHING PAD-HOOKS TO PADS.

*The Schedule referred to in these Letters Patent and making part of the same.*

TO ALL WHOM IT MAY CONCERN:

Be it known that I, GEORGE D. GILLETT, of Meridian, in the county of Cayuga, and State of New York, have invented a new and improved Method of Attaching Pad-Hooks to Pads; and I do hereby declare that the following is a full, clear, and exact description thereof, which will enable those skilled in the art to make and use the same, reference being had to the accompanying drawings, forming part of this specification, in which—

Similar letters of reference indicate like parts.

This invention consists in providing the shank of a harness-pad hook with a system of shoulders and hooks for embracing the pad, so that but little other fastening is required, and the hooks are secured to their pads in a very permanent and reliable manner, as hereinafter more fully explained.

Figure 1:
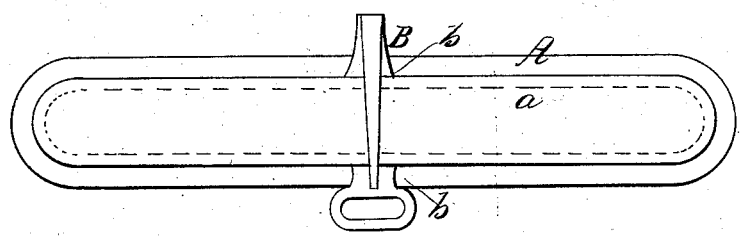
Figure 1 is a plan view of my improvement.
Figure 2:
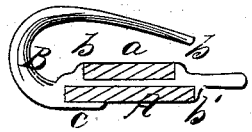
Figure 2 is a cross-section.

In the accompanying drawings, A $a$, figs. 1 and 2, is the pad, and B is the pad-hook. The shank of the hook is provided with shoulders, $b\ b$, upon its upper side, and with a shoulder, $b'$, and hook, $c$, upon its lower side, and is then sewed in between the two parts A $a$ of the pad.

With the use of the shoulders $b\ b\ b'$ and hook $c$, the fastening is so much relieved of strain that the pad-hook remains rigidly fixed in its position, and does not work loose by use.

Figure 3:
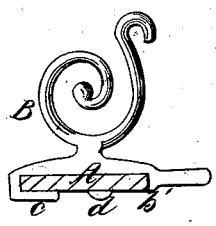
Figures 3 and 4 show modifications of the same.
Figure 4:
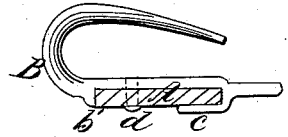

The upper shoulders $b\ b$ can be dispensed with, and the shank of the hook set wholly above the pad, as shown in figs. 3 and 4, and a screw, $d$, be used to secure the hook in its position on the pad, instead of stitching it in between the layers of the pad, as before mentioned. The hooks $c$ can be placed upon either end of the shank, as shown.

Having thus described my invention, what I claim as new, and desire to secure by Letters Patent, is—

In combination with the pad-hook B, I claim the hook $c$ and shoulder $b'$, with or without the shoulders $b\ b$, as herein shown, and for the purpose described.

The above specification of my invention signed by me, this 11th day of March, 1868.

GEO. D. GILLETT.

Witnesses:
WM. J. DODGE,
F. A. MORLEY.